Dec. 24, 1935.  B. A. STEWART  2,025,077
MIXING AND MASTICATING MACHINE
Filed July 25, 1931   2 Sheets-Sheet 1

INVENTOR.
Burns A. Stewart
BY Samuel Stearman
ATTORNEY.

Dec. 24, 1935. B. A. STEWART 2,025,077
MIXING AND MASTICATING MACHINE
Filed July 25, 1931 2 Sheets-Sheet 2
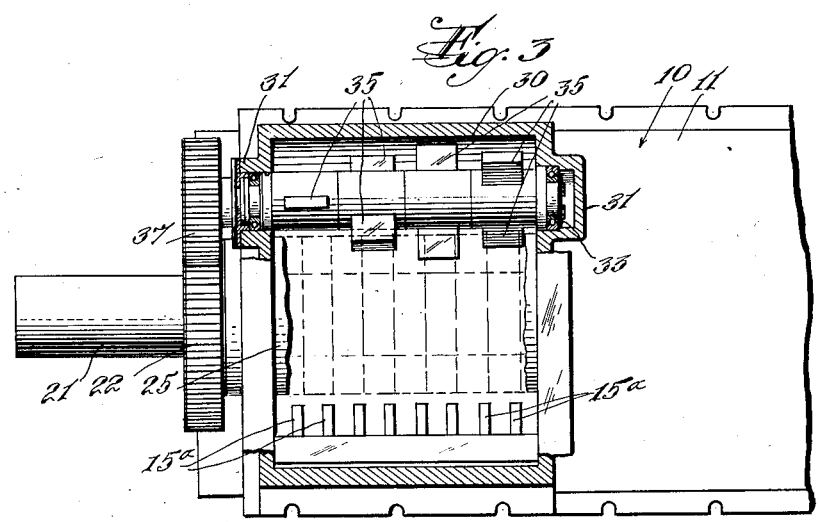
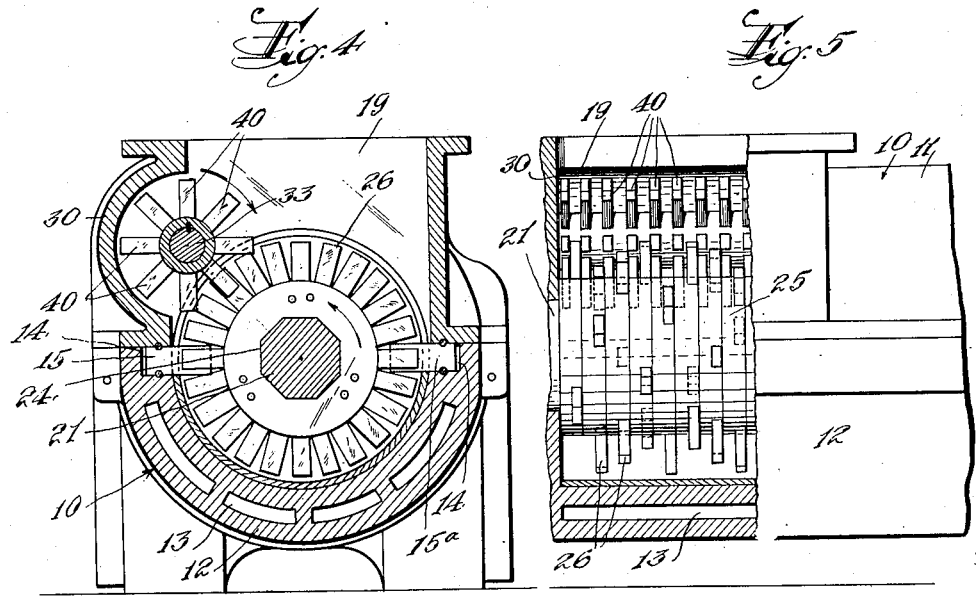
INVENTOR.
Burns A. Stewart
BY Samuel Stearman
ATTORNEY.

Patented Dec. 24, 1935

2,025,077

UNITED STATES PATENT OFFICE 2,025,077

MIXING AND MASTICATING MACHINE

Burns A. Stewart, Nutley, N. J., assignor, by mesne assignments, to The Patent and Licensing Corporation, New York, N. Y., a corporation of Massachusetts Application July 25, 1931, Serial No. 553,028

8 Claims. (Cl. 259—25)

This invention relates to improvements in mixing or masticating machinery and is concerned particularly with mechanism for improving the operation of mixing machines employed for making plastic material embodying as one of its ingredients asphalt, or similar sticky bituminous substances.

The improved mixing machine of my invention finds one adaptation in the manufacture of premolded asphalt-containing products from mixtures comprising asphalt, fibrous material and/or mineral filler material. Mixtures of this type are employed on a large scale in the manufacture of preformed expansion joints for use in the construction of concrete roadways, asphalt planking employed as a wearing or traffic surface on bridges, railway crossings, and for the manufacture of mastic shingles for roofing and like purposes.

In the manufacture of these articles it is the customary practice to extrude a plastic mass of the desired composition under pressure through a nozzle of the desired cross-section, or to form the article from such a plastic homogeneous mass under pressure between forming rolls of suitable size and shape.

The most common source of ingredients employed in making these plastic mixes is waste or scrap asphalt prepared roofing accumulating in substantial quantities in the manufacture of prepared shingles and asphalt roofing material. This waste or scrap roofing is composed generally speaking, of 12 to 15% of rag or similar fibrous felt, 50 to 60% of asphalt (substantially half of which is of a comparatively low melting point, of the order of 140 to 150° F. constituting the saturant usually employed in making roofing, and the remainder of which is of a relatively high melting point, approximating 220° F., constituting the coating for the saturated felt base) and 25 to 40% of mineral matter (in the form of crushed slate, slag or the like constituting the surfacing usually employed to mask the coating layer and provide a decorative finish for the roofing).

In the utilization of this waste or scrap roofing material for the manufacture of premolded products such as those above enumerated, it is necessary to disintegrate the fibrous felt and substantially individualize the fibers composing the same and to masticate the material so that the asphalt content may become thoroughly and homogeneously admixed with the fiber and the mineral matter and form a uniformly plastic mass. The mixing and homogenizing machine usually employed in this connection comprises an elongated chamber of substantially cylindrical form with series of stator blades fixed to its walls at horizontal diametrically opposed points thereof, and cooperating rotor blades fixed to a shaft at longitudinally spaced points alternating with the stator blades and arranged to induce shearing of the fibrous material and mastication of the mass during the forward movement thereof under the impelling action of the rotor blades.

The side walls of the chamber near one end thereof are extended upwardly beyond the periphery of the rotor blades to provide a mouth or hopper for feeding the material to the masticator.

It has been found in practice with this type of masticating or mixing machine, that during the movement of the rotor blades the material is thrown thereby upwardly against one or the other of the walls of the hopper section of the chamber, depending upon the direction of rotation of the rotor blades. Because of the sticky or gummy nature of the composition employed in making these mastic mixes, the material thus thrown by centrifugal force of the rotor blades adheres to one of the walls of the mixing chamber and accumulates thereon, the accretions becoming sufficient in time to bridge entirely across the mouth of the mixing device thus preventing further material from passing into the active sphere or path of the rotor blades. The result is that the material in the chamber is churned about and circulated therein without being effectively homogenized and discharged at the rate required in commercial practice. Attempts to force the material down into the effective masticating zone by a hand implement are exceedingly dangerous to the workmen owing to the liability of the tool being caught between the masticating knives.

The object of the invention is to provide an improved form of mixing machine of the character described which in operation will alleviate the difficulties above mentioned and prevent accumulation of the plastic material on the walls at the inlet end of the mixing machine.

In the accompanying drawings showing several embodiments of the improved form of mixing machine, Figure 1 is a view, partly in elevation and partly in section, longitudinally of the masticator;

Figure 3 is a view in section, along line 3—3 of Figure 1, certain parts being omitted for the sake of clearness;

Figure 4 is a view in transverse cross-section showing another embodiment of the invention;

Figure 5 is a view partly in elevation and partly in cross-section of the arrangement shown in Figure 4.

Figure 1:
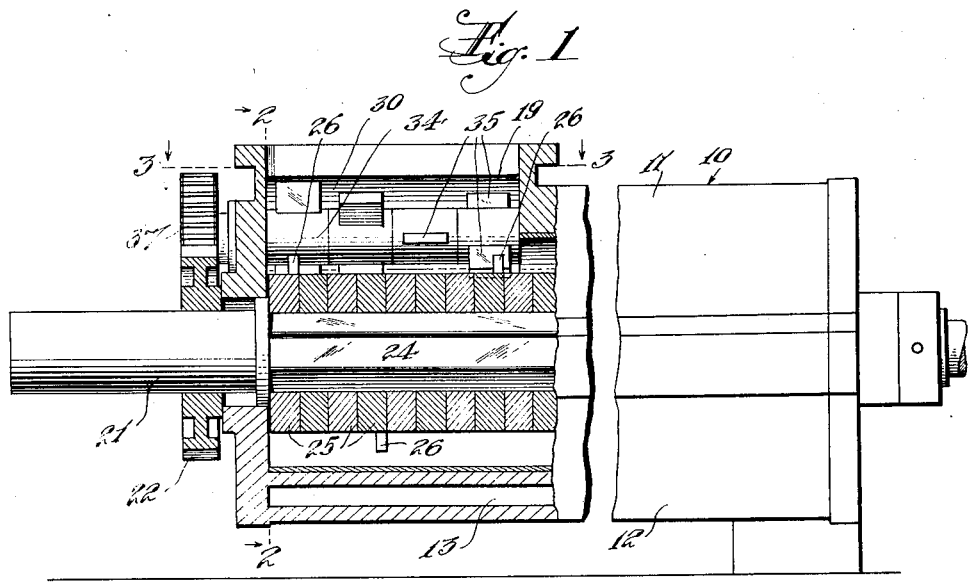

Referring in detail to the drawings, wherein like parts are indicated by similar reference characters, the numeral 10 indicates the mixing machine as a whole. As shown, it comprises an elongated two-part cylindrical chamber comprising an upper section 11 and a lower section 12, to which the upper section may be separably secured in any convenient manner. The walls of the upper and lower sections are steam jacketed as shown at 13 for introduction of steam or other temperature regulating medium. The wall of the lower section 12 is also recessed as shown at 14 along its opposite longitudinal sides at the upper extremities thereof for the accommodation of a series of stator blades 15 along one side of the chamber and a similar series of stator blades 15a along the opposite side thereof. The upper section 11 is formed with longitudinal flanges 17, the lower faces of which rest upon the lower section 12. The upper section is enlarged at one end thereof by extending the walls upwardly to provide a mouth or hopper section 19 for receiving the material to be masticated, mixed and homogenized in their passage through the machine from the receiving to the discharge end thereof.

A rotatable shaft extends longitudinally through the chamber, this shaft having a drive gear 22 keyed thereto and driven from any convenient source of power. The shaft has its surface, internally of the chamber, shaped to provide a plurality of flat surfaces 24, and in the form shown, the shaft is of octagonal, transverse cross-section. A series of collars or rings 25, bored centrally to conform to the surface of the shaft, are fixed upon the shaft. Each of these collars has fixed thereto a series of radially extending blades 26 spaced equally along the periphery of the collars. These collars, carrying the blades 26, are mounted on the shaft in progressively offset positions circumferentially thereof, thus providing three series of blades, the blades of each series extending radially from the shaft in a spiral path around the shaft, the corresponding blades of the several spiral series being equi-spaced from one another. The collars are affixed to the shaft at spaced points axially of the shaft so that during rotation of the shaft the rotor blades will traverse the spaces between adjacent stator blades and provide a shearing action and cause disintegration and mastication of the material in the chamber. At the same time the spiral arrangement of the rotor blades forces the material forwardly from the receiving to the discharge end of the chamber. The improvement comprising my invention resides in the provision of means within the hopper section of the chamber for forcing material fed to the chamber and material thrown centrifugally outward by the rotor blades, into the active sphere of the cooperating blades and for preventing accumulation of material on the walls of the hopper section which may retard the intake capacity of the machine.

In accordance with the invention, one of the side walls of the hopper section of the machine is enlarged to provide an arcuate wall 30 upon that side of the hopper sections opposed to the direction of rotation of the rotor blades 26. The end walls of the hopper section are also provided with housings 31 to accommodate the bearings of an auxiliary shaft 33. In the form of the invention shown in Figures 1, 2, and 3, a series of collars 34 are keyed to the shaft 33, these collars each carrying radially extending blades or fins 35 in diametrically opposed pairs, the collars being preferably fixed upon the shaft, as shown, so that the successive blades of each pair are offset circumferentially of the shaft. The blades 35 are of such length that their peripheral path lies outside of the peripheral path of the rotor blades 26 as clearly shown in Figure 2. By means of a gear wheel 37 keyed to the auxiliary shaft, the latter may be driven to rotate in a direction counter to the direction of rotation of the shaft 21, so that material in the hopper section will be kept moving and forced into the active zone of the masticator blades and to serve as a feed back for material thrown centrifugally out of this sphere during the movement of the rotor blades 26.

Figures 2, 6:
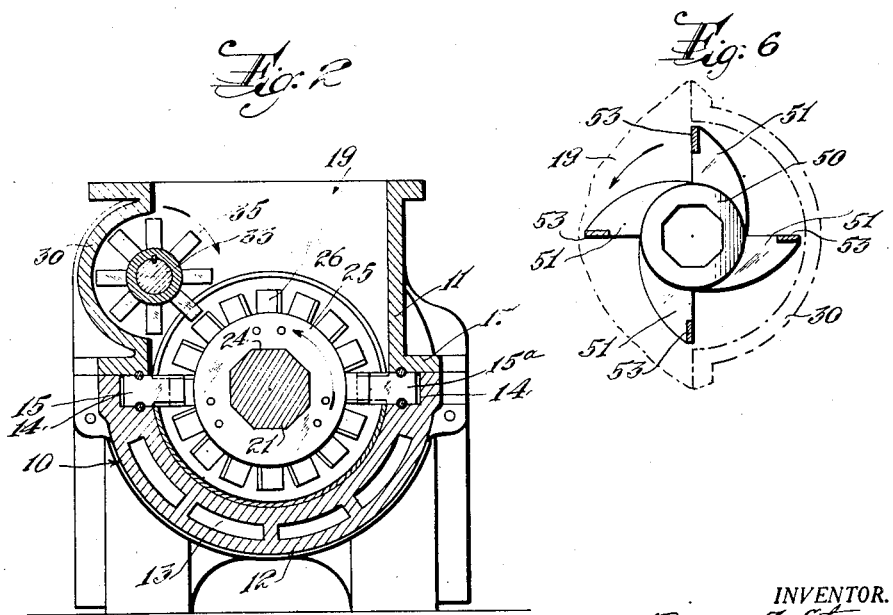
Figure 2 is a vertical section taken transversely along the line 2—2 of Figure 1.
Figure 6 is an end elevation of another form of device that may be employed in accordance with the invention.

In the embodiment of the invention shown in Figures 4 and 5, the arrangement of the force feed mechanism is substantially the same as that shown in Figures 1, 2 and 3, except that the blades 40 are so shaped and of sufficient length to extend inwardly of the peripheral path of the rotor blades 26, the blades 40 being arranged in spiral series around the auxiliary shaft at suitably spaced points to mesh with the rotor blades 26 and thus aid the shearing and masticating action of the latter upon the material fed to the mixing chamber.

The detail shown in Figure 6 illustrates a still further modification of the force feed device that may be employed in accordance with the invention. In this form a collar 50, adapted to fit the auxiliary shaft carries a series of radial arms 51, near each end of the shaft and, if desired, a similar series centrally of the shaft, the arms of each series being aligned longitudinally of the shaft. The outer extremities of the correspondingly positioned arms of each series are connected by longitudinally extending bars 53, thus forming a series of paddle blades so that rotation of the auxiliary shaft in a direction opposed to that of the shaft 21 carrying the rotor blades 26, will cause forceful feeding of the material into the active zone of the rotor blades and prevent accumulation of material on the walls of the hopper. It will be understood of course that in the form shown in Figure 6 the extremities of the arms 51, are such that the peripheral path of rotation will lie outside the peripheral path of the rotor blades 26.

I claim as my invention:

1. In a mixer of the class described, an elongated chamber, stator blades fixed to opposite walls of said chamber, a rotatable shaft extending longitudinally within the chamber, blades fixed on said shaft in a spiral series, a rotatable shaft mounted above said first named shaft and having its axis parallel to the axis of the first named shaft, and paddle blades fixed to the last named shaft and operative to return material thrown out of the sphere of action of said first named blades back to said sphere of action.

2. In a mixer of the class described, an elongated chamber, stator blades fixed to opposite walls of said chamber, a rotatable shaft extending longitudinally within the chamber, blades fixed on said shaft in a spiral series, a hopper section formed as an upwardly extending portion of said chamber near one end thereof, and means within said hopper section operative to return material thrown outwardly of the sphere of action of said blades back to said sphere of action.

3. In a mixer of the class described, an elongated chamber, stator blades fixed to opposite walls of said chamber, a rotatable shaft extending longitudinally within the chamber, blades fixed on said shaft in a spiral series, the walls of said chamber being extended upwardly near one end thereof to provide a hopper section for the delivery of material to the chamber, one of said walls being enlarged outwardly to provide an arcuate recess and means within said recess operative to return material thrown out of the sphere of action of said blades back to said sphere of action.

4. In a mixer of the class described, an elongated chamber, stator blades fixed to opposite walls of said chamber, a rotatable shaft extending longitudinally within the chamber, rotor blades fixed on said shaft in a spiral series, a rotatable shaft mounted above and laterally of said first named shaft and paddle blades fixed to the last named shaft operative to return material thrown out of the sphere of action of said rotor blades back to said sphere of action.

5. In a mixer of the class described, comprising a chamber having stationary blades and cooperating rotary blades arranged to masticate a mixture of fibrous and gummy material, the improvement which comprises a rotary paddle arranged to operate as a feed back for material thrown out of the masticating zone by said rotary blades.

6. In a mixer of the class described, comprising a chamber having stationary blades and cooperating rotary blades arranged to masticate a mixture of fibrous and gummy material, the improvement which comprises a rotary paddle mounted adjacent one wall of the chamber and arranged to operate as a feed back for material thrown out of the masticating zone by said rotary blades.

7. In a mixer of the class described, comprising a chamber having stationary blades and cooperating rotary blades arranged to masticate a mixture of fibrous and gummy material, the improvement which comprises a rotary paddle mounted above said rotary blades adjacent one longitudinal wall of the chamber and arranged to operate to force material fed to the chamber into the masticating zone and as a feed back for material thrown out of the masticating zone by said rotary blades.

8. In a mixer of the class described, comprising a chamber having stationary blades and cooperating rotary blades arranged to masticate a mixture of fibrous and gummy material, the improvement which comprises a rotary paddle mounted upwardly of said rotary blades adjacent one wall of the chamber, said paddle being rotatable in a direction opposed to the direction of rotation of said rotary blades whereby to force material fed to the chamber into the sphere of action of the rotary blades and as a feed back for material thrown out of the masticating zone by said rotary blades.

BURNS A. STEWART.